(12) United States Patent
Burks et al.

(10) Patent No.: US 7,732,781 B2
(45) Date of Patent: Jun. 8, 2010

(54) HAND-HELD, MECHANICALLY COOLED, RADIATION DETECTION SYSTEM FOR GAMMA-RAY SPECTROSCOPY

(75) Inventors: Morgan Thomas Burks, Oakland, CA (US); Joel Del Eckels, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 245 days.

(21) Appl. No.: 12/105,503

(22) Filed: Apr. 18, 2008

(65) Prior Publication Data

US 2010/0090121 A1    Apr. 15, 2010

Related U.S. Application Data

(60) Provisional application No. 60/925,485, filed on Apr. 20, 2007.

(51) Int. Cl.
*F25D 19/04*    (2006.01)
*G01T 1/24*    (2006.01)

(52) U.S. Cl. .............................. 250/370.15; 250/339.03

(58) Field of Classification Search ............ 250/339.03, 250/370.11, 370.15; 267/137, 140.11; 396/535
See application file for complete search history.

(56) References Cited

U.S. PATENT DOCUMENTS

| | | | | |
|---|---|---|---|---|
| 3,851,173 A | * | 11/1974 | Taylor et al. ................. | 250/332 |
| 4,423,605 A | * | 1/1984 | Petrick et al. ................. | 62/467 |
| 4,450,693 A | * | 5/1984 | Green et al. .................. | 62/52.1 |
| 4,851,684 A | * | 7/1989 | Martin et al. ................ | 250/352 |
| 5,274,237 A | * | 12/1993 | Gallagher et al. ...... | 250/370.15 |
| 5,382,797 A | * | 1/1995 | Kunimoto et al. ........... | 250/352 |
| 5,412,951 A | * | 5/1995 | Wu ................................ | 62/6 |
| 5,811,816 A | * | 9/1998 | Gallagher et al. ...... | 250/370.15 |
| 6,380,544 B1 | * | 4/2002 | Broerman .............. | 250/370.15 |
| 6,396,061 B1 | * | 5/2002 | Madden et al. ........ | 250/370.15 |
| 7,105,821 B1 | * | 9/2006 | Kennedy et al. ....... | 250/339.07 |
| 2004/0217296 A1 | * | 11/2004 | Rowland et al. ....... | 250/370.15 |

* cited by examiner

*Primary Examiner*—David P Porta
*Assistant Examiner*—David S Baker
(74) *Attorney, Agent, or Firm*—John H. Lee; James S. Tak (57) ABSTRACT

In one embodiment, a radiation detection system is provided including a radiation detector and a first enclosure encapsulating the radiation detector, the first enclosure including a low-emissivity infra-red (IR) reflective coating used to thermally isolate the radiation detector. Additionally, a second enclosure encapsulating the first enclosure is included, the first enclosure being suspension mounted to the second enclosure. Further, a cooler capable of cooling the radiation detector is included. Still yet, a first cooling interface positioned on the second enclosure is included for coupling the cooler and the first enclosure. Furthermore, a second cooling interface positioned on the second enclosure and capable of coupling the first enclosure to a cooler separate from the radiation detection system is included. Other embodiments are also presented.

25 Claims, 6 Drawing Sheets

HAND-HELD, MECHANICALLY COOLED, RADIATION DETECTION SYSTEM FOR GAMMA-RAY SPECTROSCOPY

RELATED APPLICATIONS

This application claims priority to provisional application Ser. No. 60/925,485 filed on Apr. 20, 2007, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to radiation detection systems, and more particularly to portable radiation detection systems.

BACKGROUND

Radioactive materials are often detected and identified by measuring gamma-rays emitted from the materials. The energy of gamma-rays is specific to that particular material and acts as a "finger print" to identify the material. A high resolution detector typically has better sensitivity and identification capability.

A germanium semiconductor, cooled to 100 K or below, gives the best resolution of current available detector materials and is often employed for this purpose. However, the requirement of keeping the detector below 100 K requires special cooling mechanisms to be implemented, including the use of liquid nitrogen. These requirements mean that germanium-based detectors are typically constrained to use in the laboratory where there is access to liquid nitrogen. Furthermore, the large size of the container of liquid nitrogen means that the radiation detection system is often too heavy to be easily moved by one person. Thus, the weight and power requirements of these detection systems make them unpractical for hand-held use.

There is thus a need for addressing these and/or other issues associated with the prior art.

SUMMARY

A radiation detection system is provided including a radiation detector and a first enclosure encapsulating the radiation detector, the first enclosure including a low-emissivity infra-red (IR) reflective coating used to thermally isolate the radiation detector. Additionally, a second enclosure encapsulating the first enclosure is included, the first enclosure being suspension mounted to the second enclosure. Further, a cooler capable of cooling the radiation detector is included. Still yet, a first cooling interface positioned on the second enclosure is included for coupling the cooler and the first enclosure. Furthermore, a second cooling interface positioned on the second enclosure and capable of coupling the first enclosure to a cooler separate from the radiation detection system is included.

Other aspects, advantages and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
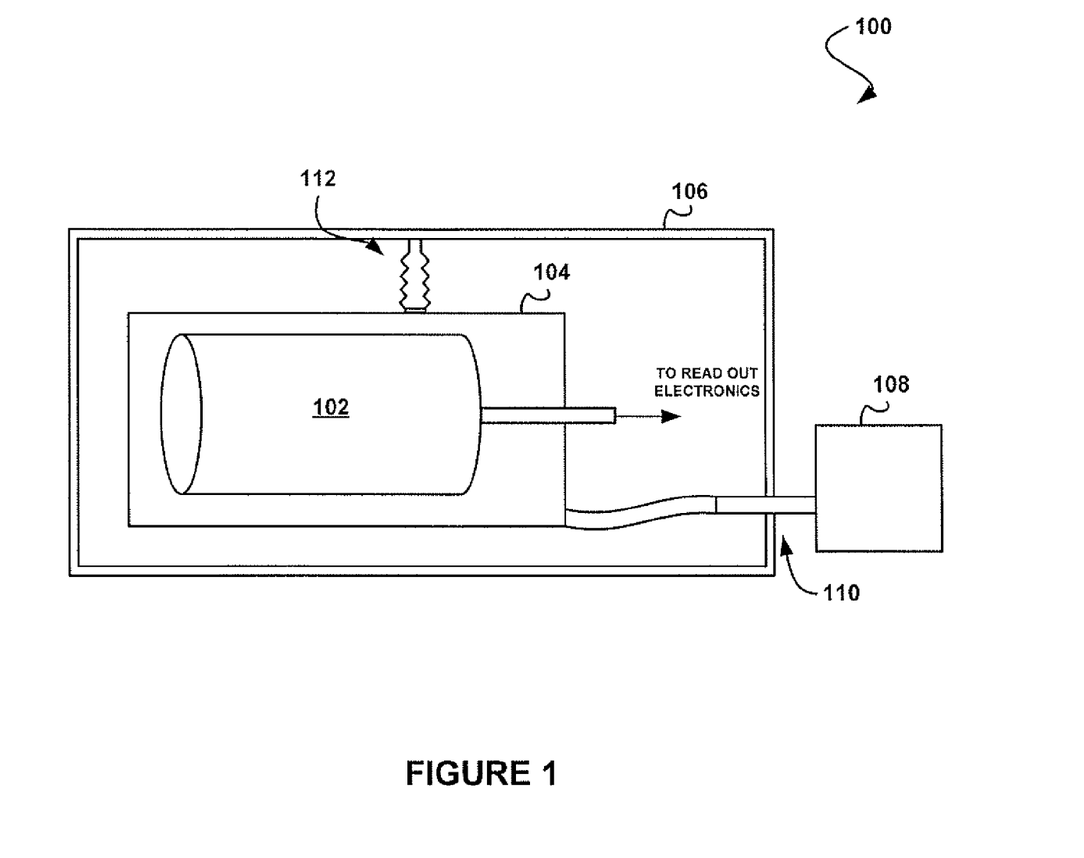
FIG. 1 shows a radiation detection system, in accordance with one embodiment.

FIG. 1 shows a radiation detection system 100, in accordance with one embodiment. As shown, a radiation detector 102 is provided. In the context of the present description, a radiation detector refers to any detector capable of detecting radiation. For example, in one embodiment, the radiation detector may include, a germanium (Ge) crystal for gamma-ray detection.

Furthermore, a first enclosure 104 encapsulating the radiation detector 102 is provided. In this case, the first enclosure 104 includes a low-emissivity infra-red (IR) reflective coating used to thermally isolate the radiation detector 102. The low-emissivity infra-red (IR) reflective coating may include any coating capable of being used to thermally isolate the radiation detector 102. For example, in one embodiment, the coating may include a gold coating. As an option, the gold coating may be a highly polished gold coating. Furthermore, the coating may be located on the inside and/or the outside of the first enclosure 104.

As shown further, a second enclosure 106 encapsulating the first enclosure 104 is also provided. In one embodiment, the second enclosure 106 may include an aluminum vacuum cryostat. As an option, inside walls of the aluminum vacuum cryostat facing the detector 102 may include a low-emissivity infra-red (IR) reflective coating, such as gold.

In this case, the first enclosure 104 is suspension mounted to the second enclosure 106. The first enclosure 104 may be suspension mounted to the second enclosure 106 in a variety of ways. For example, in one embodiment, the first enclosure 104 may be suspension mounted to the second enclosure 106 utilizing one or more low or non-thermally conducting lattice structures. In another embodiment, the first enclosure 104 may be suspension mounted to the second enclosure 106 utilizing low or non-thermally conducting point mounts, such as a pin point mounts, etc.

Additionally, a cooler 108 capable of cooling the radiation detector 102 is provided. The cooler 108 may be any cooler capable of cooling the radiation detector 102. For example, in one embodiment, the cooler 108 may include a Stirling-cycle mechanical cooler.

A first cooling interface 110 positioned on the second enclosure 106 is also provided for coupling the cooler 108 and the first enclosure 104. Furthermore, a second cooling interface 112 is provided. As shown, the second cooling interface 112 is positioned on the second enclosure 106.

In operation, the second cooling interface 112 is capable of coupling the first enclosure 104 to a cooler separate from the radiation detection system 100 (not shown). For example, the second cooling interface 112 may couple the first enclosure 104 to a cooler located in a laboratory. Of course, the second cooling interface 112 may be capable of coupling the first enclosure 104 to any cooler positioned in any room or otherwise not part of the radiation detection system 100.

More illustrative information will now be set forth regarding various optional architectures and features with which the foregoing framework may or may not be implemented. It should be strongly noted that the following information is set forth for illustrative purposes and should not be construed as limiting in any manner. Any of the following features may be optionally incorporated with or without the exclusion of other features described.

Figure 2:
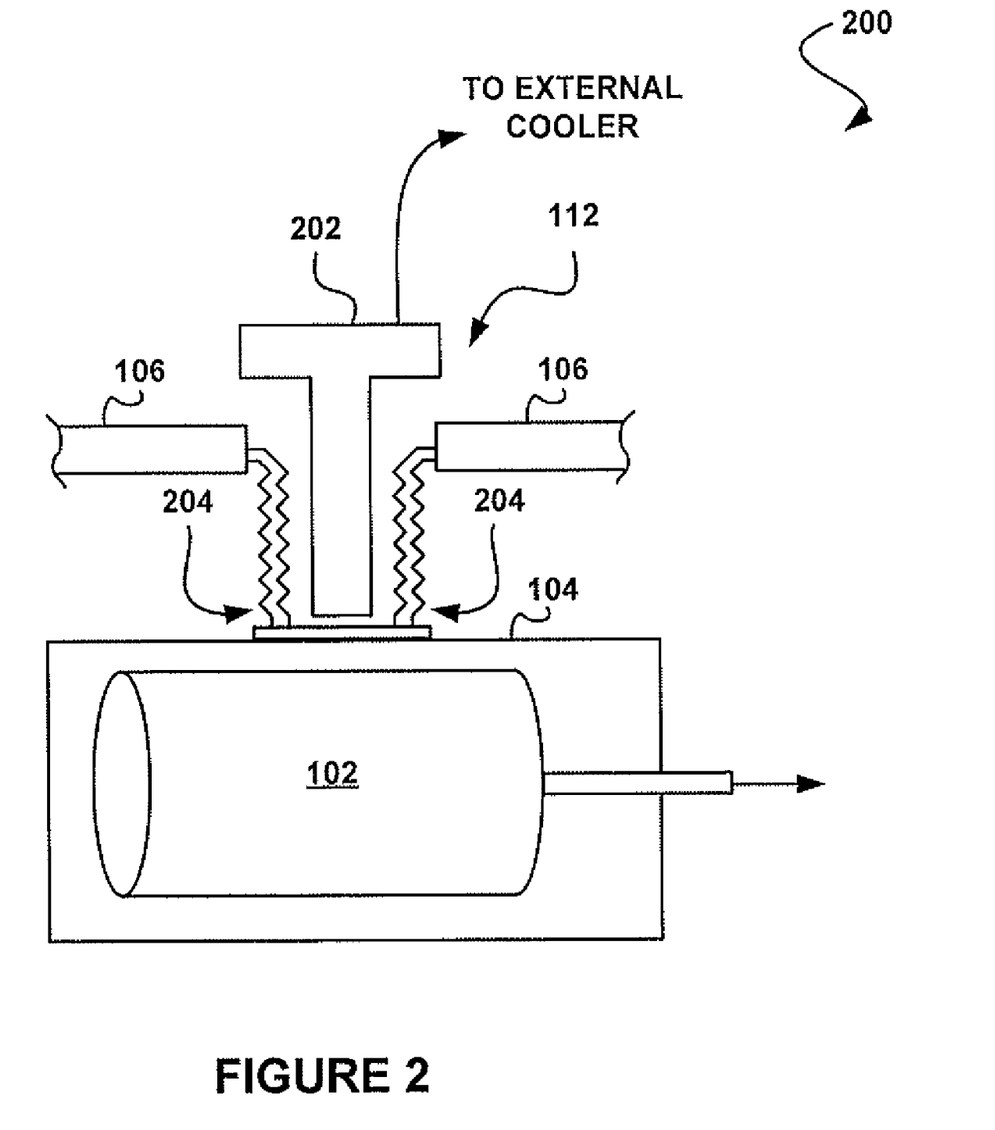
FIG. 2 shows a cooling interface system for the radiation detection system of FIG. 1, in accordance with one embodiment.

FIG. 2 shows a cooling interface system 200 for the radiation detection system 100 of FIG. 1, in accordance with one embodiment. As an option, the cooling interface system 200 may be utilized as the second cooling interface 112 of FIG. 1. Of course, the cooling interface system 200 may be implemented in any desired environment.

As shown, the second cooling interface 112 may include a cooling finger 202 and flexible vacuum bellows 204 for coupling the first enclosure 104 to an external cooler. In this case, the cooling finger 202 may include any mechanism capable of transferring heat. Furthermore, the flexible bellows 204 may be built into at least one wall of the second enclosure 106. In this way, the second cooling interface 112 is capable of providing thermal coupling between the first enclosure 104 and the external cooler.

In operation, the external cooler may be utilized to cool the first enclosure 104 and/or the radiation detector 102 to a desired or predetermined temperature. The external cooler may then be disconnected and a system cooler (e.g. the cooler 108 of FIG. 1) may be utilized to cool the first enclosure 104 and/or the radiation detector 102. In this way, the system cooler may be utilized to at least maintain a temperature of the first enclosure 104 and/or the radiation detector 102 while the system is in a mobile state, such as being utilized in a hand-held capacity. As an option, the cooler being used in the mobile state may further cool the first enclosure 104 and/or the radiation detector 102 to a temperature below the temperature provided by the external cooler.

Figure 3:
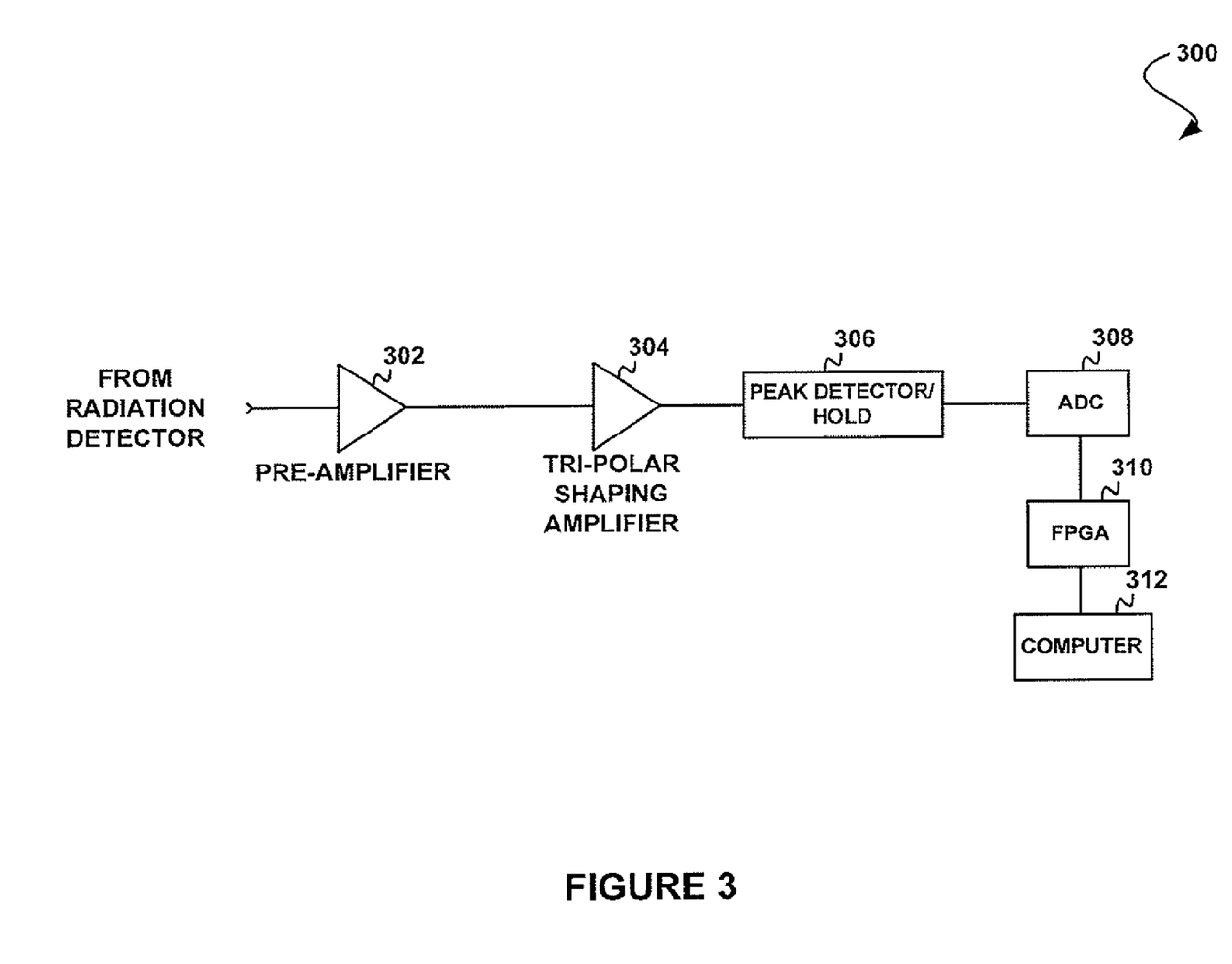
FIG. 3 shows readout electronics for a radiation detection system, in accordance with one embodiment.

FIG. 3 shows readout electronics 300 for a radiation detection system, in accordance with one embodiment. As an option, the readout electronics 300 may be implemented in the context of the radiation detection system 100 of FIG. 1. Of course, the readout electronics 300 may be implemented in any desired environment.

As shown, the readout electronics 300 may include a low-noise pre-amplifier 302, a tri-polar shaping amplifier 304, a peak detector/hold device 306, an analog to digital converter 308, a field-programmable gate array (FPGA) 310, and a computer 312. In operation, the readout electronics 300 may receive a signal from a radiation detector. The signal may then be amplified and converted using components of the readout electronics, and further processed using the computer 312. It should be noted that the readout electronics 300 are one optional embodiment capable of being utilized to receive and process a detector signal. In various other embodiments, components of the readout electronics 300 may vary.

Figure 4:
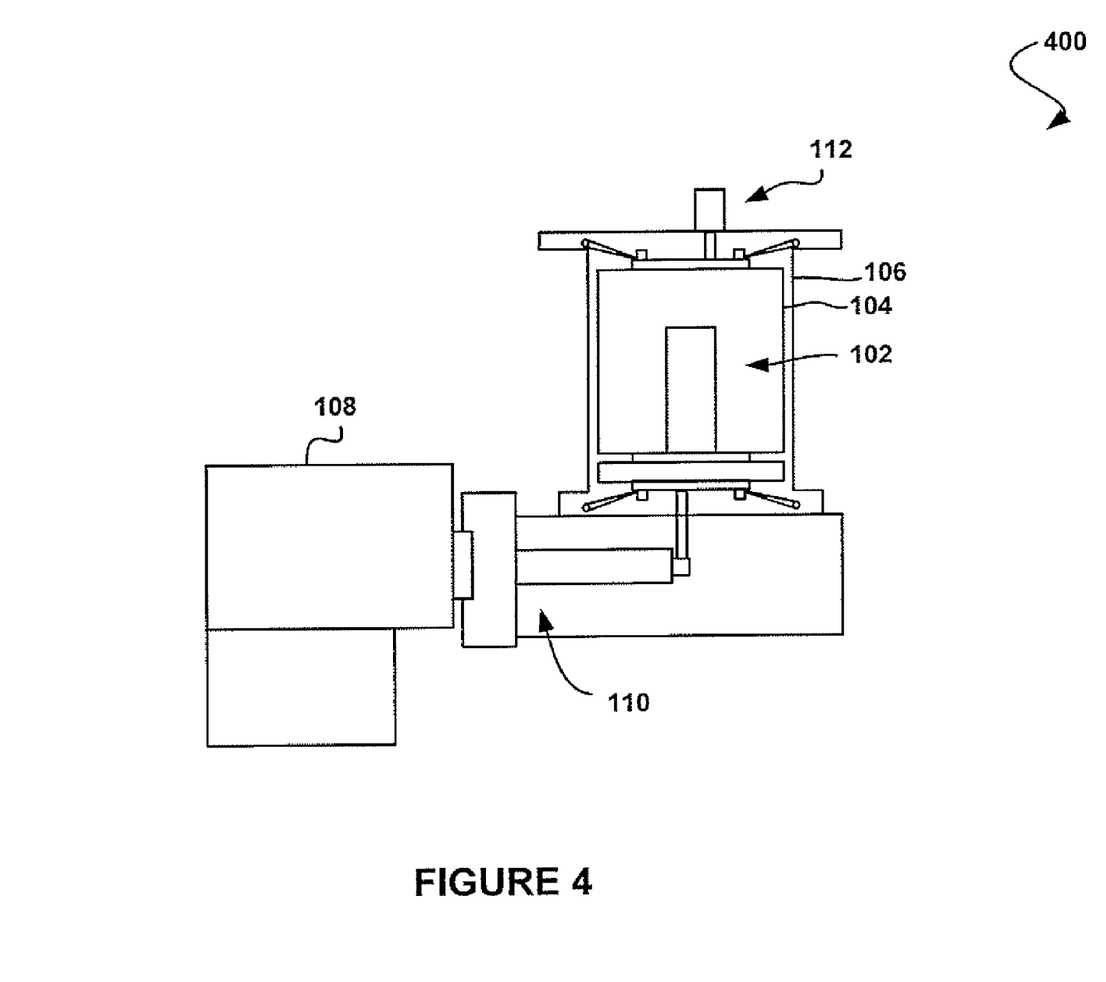
FIG. 4 shows a radiation detection system, in accordance with another embodiment.

FIG. 4 shows a radiation detection system 400, in accordance with another embodiment. As an option, the radiation detection system 400 may be implemented in the context of the functionality and architecture of FIGS. 1-3. Of course, however, the radiation detection system 400 may be implemented in any desired environment. It should also be noted that the aforementioned definitions may apply during the present description.

As shown, the radiation detection system 400 includes the radiation detector 102, the first enclosure 104, the second enclosure 106, the cooler 108, and the first and second cooling interfaces 110 and 112. In one embodiment, the radiation detector 102 may include a germanium semiconductor detector. In operation, the radiation detector 102 may be cryogenically cooled with the cooler 108, which may include a Stirling-cycle cryocooler. One possible Stirling-cycle cryocooler may be provided by RICOR—Cryogenic & Vacuum Systems, En Harod Ihud 18960, Israel. It should be noted that this light weight Stirling-cycle cryocooler may be utilized because of the thermal design of the radiation detection system 400.

In one embodiment, the radiation detection system 400 may be capable of rapid cool-down from room temperature (approximately 300 K) to 100 K in approximately two hours. This may be accomplished with an external cooler (e.g. a liquid cryogen cooler, a Joule-Thomson cooler, etc.) which may make a thermal connection with a mechanical bellows connection provided by the second cooling interface 112. It should also be noted that this functionality may be implemented because the radiation detection system 400 only utilizes one enclosure (i.e. the first enclosure 104) to house the radiation detector 102 and a vacuum cryostat (i.e. the second enclosure 106). Thus, multiple thermal enclosures need not be penetrated to provide thermal coupling between the external cooler and the first enclosure 104.

As an option, the radiation detection system 400 may be implemented as a hand-held instrument used to detect gamma-rays in the energy range of approximately 30 keV to nearly 3 MeV. In this case, the second enclosure 106 may include an aluminum vacuum cryostat with a germanium crystal inside for use as the radiation detector 102. Electrical contacts may be made through one end of the first enclosure 104 housing the crystal.

The crystal may be any N or P type semiconductor and may be electrically contacted via insulating feed-throughs. An insulating environment within the first enclosure 104 may also be provided by filling the first enclosure with a non-conductive gas or evacuated of any atmosphere depending on how close the crystal is to a structure that could electrically arc.

In this case, the germanium crystal preferably operate at a temperature of approximately 100 K or below. This may be accomplished utilizing the cooler 108. As an option, the radiation detection system 400 may be battery powered. Because the thermal design allows the use of a light weight cooler, the detection system 400 may be light weight (e.g. approximately 6 pounds) and operate on low power (e.g. 6-10 Watts input power or lower). In one embodiment, the radiation detection system 400 may be less than about 25 pounds, between about 24 pounds and about 1 pound, or between about 3 and about 6 pounds, etc. The light weight allows the detection system 400 to be easily carried by hand. Additionally, the low power consumption allows for the detection system 400 to operate a long time on a single set of batteries (e.g. 10 hours).

The heat load of the radiation detection system 400 may be controlled by a combination of factors. For example, the heat load of the detection system 400 may be controlled by utilizing a low thermal conductivity suspension to hold the radiation detector 102 and the radiation detector case (i.e. the first enclosure 104) in the vacuum cryostat (i.e. the second enclosure 106). This will prevent heat from being conducted from the cryostat to the radiation detector 102. In addition, special surface preparation may be used to create very low emissivity surfaces on the first enclosure 104 as well as the inside of the cryostat.

For example, a low-emissivity IR-reflecting coating, exhibiting high IR reflection properties (e.g. approximately 98% reflection of IR photons) may be utilized. The coating may be formed by a suitable coating process which coats a highly reflective material, such as gold, on the surface of the enclosure(s). In one commercially available coating process, aluminum pieces are first polished, plated with nickel (e.g. 15 microns), and then plated with gold (e.g. 75 microns) such that the surface is highly reflective. This low emissivity surface will reduce the infrared load transmitted to the radiation detector 102.

As an option, the cooler 108 may be used to cool the radiation detection system 400 during normal operation. However, the external cooler may be used to cool radiation detection system 400 down to an operating temperature from room temperature. As noted above, flexible bellows may be built into at least one wall of the vacuum cryostat. For initial cooling, these bellows may be pushed in such a way that contact may be made with the radiation detector 102 and/or the first enclosure 104. The external cooling system may then cool the radiation detector 102 through the thermal contact made with the flexible bellows.

Figure 5:
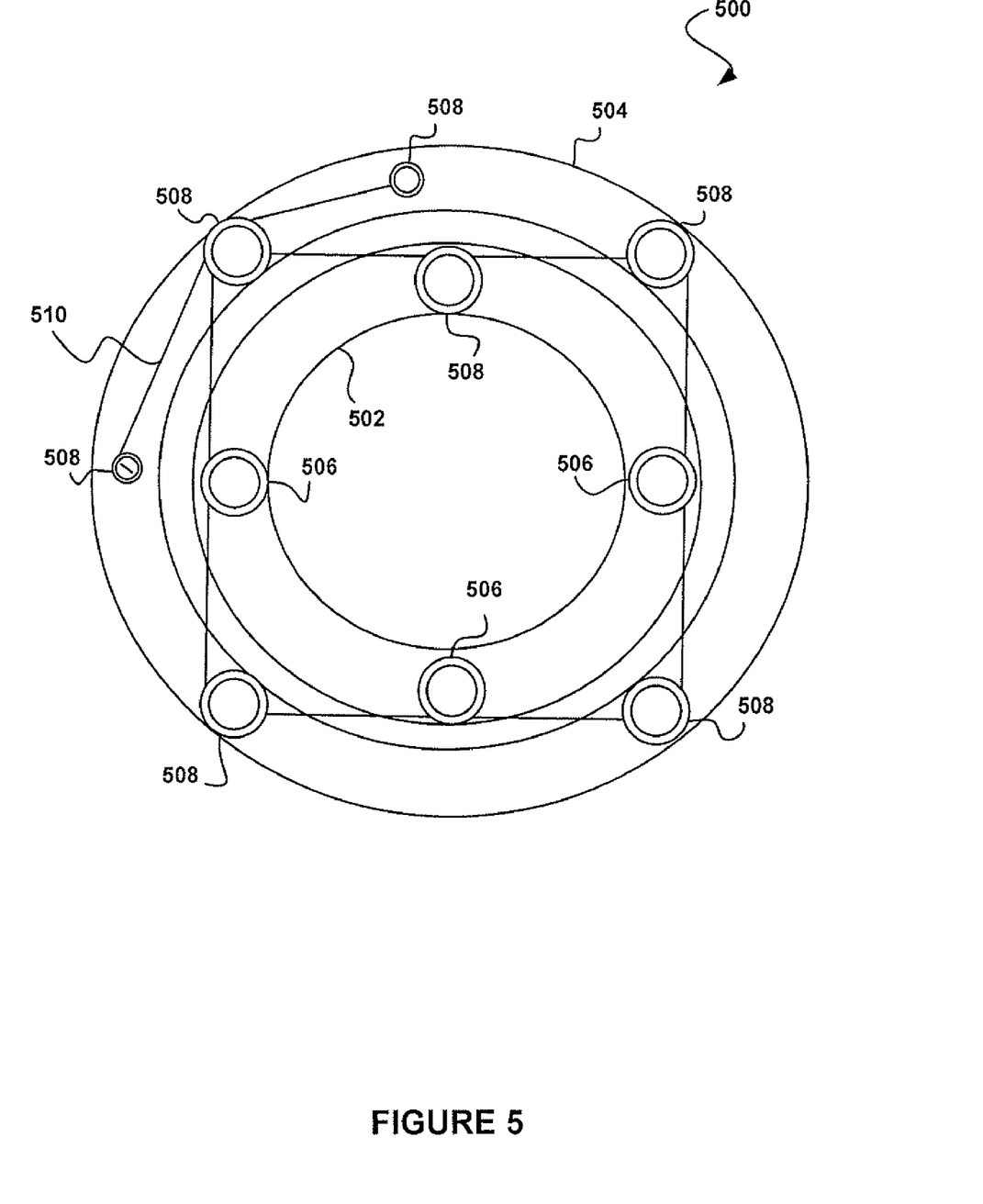
FIG. 5 shows the details of one exemplary lattice structure including a pair of ring-shaped connectors for suspension mounting an enclosure, in accordance with one embodiment.

Additionally, the first enclosure 104 may be suspension mounted utilizing a plurality of low or non-thermally conducting lattice structures. FIG. 5 shows the details of one exemplary lattice structure 500 including a pair of ring-shaped connectors, such as inner ring 502 and outer ring 504. It is notable that the terms "outer" and "inner" used to describe the rings do not refer to diameter size, rather to the relative radial position from the core. Thus, while the drawings show the outer ring 504 having a greater diameter than the inner ring 502, the diameter configurations may be reversed in the alternative.

As shown, the inner ring 502 includes a plurality of tie posts 506, and the outer ring 504 also includes a plurality of tie posts 508. The posts for each dual ring pair may extend in the same direction or in opposite directions. Tie downs, such as flexible stringing 510, may be used to connect the posts 508 of the outer ring to the posts 506 of the inner ring to coaxially secure and locate the two rings 502 and 504 with respect to each other.

In one embodiment, a low thermal conductivity material, such as Kevlar string, may be utilized for the tie downs, and placed under tension, sewn or laced between the coaxial components. Alternatively, other low thermal conduction materials, such as aerogel, may be utilized for the suspension-mount to tailor the heat load reduction to a cooler capacity.

In one embodiment, the dual-ring suspension mounting lattice structure 500 may be utilized to suspension-mount the first enclosure 104 in the second enclosure 106 of FIG. 4 such that direct contact between the enclosures is prevented. In particular, two pairs of rings may be utilized to suspension-mount the first enclosure 104 from the second enclosure 106 at opposite ends thereof. The rings may be attached to a corresponding enclosure using, for example, using conductive screws to produce a metal-to-metal connection. This manner of connection, however, does not cause a thermal shunt because thermal resistance is provided by the tie down string which connects the posts of the inner rings to the outer rings.

In this manner, the first enclosure 104 may be non-contactedly suspension-mounted to the second enclosure 106 to provide impact tolerance, and simultaneous thermal isolation. Thermal isolation is attributable to the reduction of thermal conduction combined with the operation of the IR reflecting coatings. Holes in the first and second enclosures are minimized to only those utilized for electrical connections (which are subsequently sealed). There are no penetrations through the enclosures to provide structural mounting struts. String or strut holes in the enclosures would reduce the effectiveness of the thermal shields, such as by requiring a larger cooling pump. Thus, the benefits of the IR reflector coatings are maximized because no holes are required for the structural mounting points.

It should be noted that the system 500 may achieve significantly lower heat load than previous instruments. Furthermore, this may be accomplished without using intermediate shields. For example, a surface area of the second enclosure 106 may be minimized with respect to the first enclosure 104. This has a big effect on total heat load and allows the elimination of any intermediate shields. In one embodiment, the ratio of the inner surface area of the second enclosure 106 to the outer surface area of the first enclosure 104 may be less than about 1.5. In another embodiment, the ratio of the inner surface area of the second enclosure 106 to the outer surface area of the first enclosure 104 may be about 1.4. In still other embodiments, the ratio of the inner surface area of the second enclosure 106 to the outer surface area of the first enclosure 104 may be between about 1 and 1.5.

Figure 6:
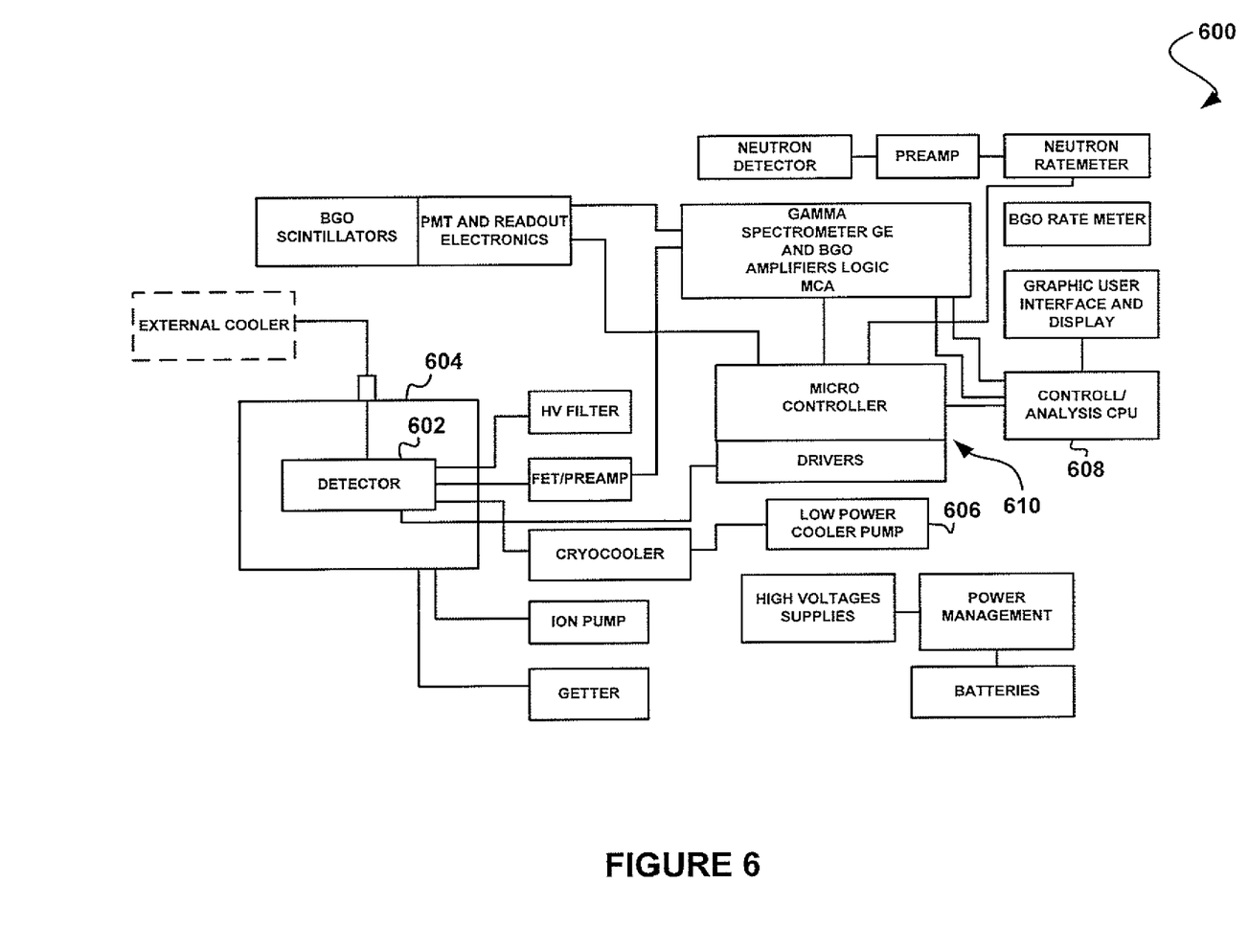
FIG. 6 shows a radiation detection system, in accordance with another embodiment.

FIG. 6 shows a radiation detection system 600, in accordance with another embodiment. As an option, the radiation detection system 600 may be implemented in the context of the functionality and architecture of FIGS. 1-5. Of course, however, the radiation detection system 600 may be implemented in any desired environment. Again, the aforementioned definitions may apply during the present description.

As shown in FIG. 6, the radiation detection system 600 may include a compactly-sized, portable radiation detection and analysis apparatus. Many of the functional components of the radiation detection apparatus are shown in FIG. 6, with the system being relatively small, suitable for hand-held operation. In particular, integration of a coated detector case 602 and vacuum cryostat 604 enables system viability as a compact, lightweight, completely functional stand-alone unit, weighing about six pounds and suitable for handheld operation. Additionally, lightweight battery operation of a Ge crystal is enabled by the use of the thermal isolation of the coated detector case 602 and vacuum cryostat 604, as discussed above, due to the lower power requirements for cooling the core to cryogenic temperatures.

Enabling the system of about six pounds total weight, including batteries that power the system for about 10 hours, is basic power management combined with the absence of any nested thermal enclosures. A low power cooler pump 606 and low power consumption electronics are provided. The electronics including, for example, a computer 608 and other electronics, such as two low power high voltage supplies for detector bias and vacuum pumping, a multi-channel analyzer (MCA), DC filtering circuits, multiple serial port connections for all system communications, an integrated power management control system, amplifiers far preparing the detector signal for the MCA, a Compton rejection logic circuit, amplifiers for a Compton detector, high voltage for the neutron detector, and amplifiers for the neutron detector. In this case, the vacuum system may include a getter and/or a miniature ion pump that uses very little current to pump gases.

As an option, power management of the system may be automatic and controllable from a port to the computer 608. The computer 608 may provide power routing, and DC levels for a variety of different parts, etc. Optionally, power may be supplied by internal batteries or from an external power source. When external power is available, the power may be used to simultaneously charge batteries and power the cooler electronics. Inputs may be provided for most any power source including DC and AC, low and high voltage.

As an option, a controller 610 may provide counting functions for pulses from a detector, neutron detectors, controls of the high voltage for the detector and vacuum system, monitoring for voltages and currents of the vacuum system, measuring of temperature of the cryogenic load, monitoring and adjusting of any vibration inherent in the mechanical cooler, etc. The controller 610, may also be utilized to monitor the temperature of the detector on a real time basis. This feature may be used to know what the energy calibration will be at all times.

In one embodiment, a self protection feature may be built into the system via the controller 610. In such case, the ion pump current may be monitored and if it exceeds a preset value, the system will report an error (e.g. a vacuum leak error) and shut down. If the temperature of the crystal exceeds a preset maximum, the high voltage bias may be shut down, preventing damage to the crystal. Additionally, vibration control may also be monitored using an accelerometer.

Computer software may also be provided to control a user interface. Accessible by touch screen on the computer may be, for example, four functions including search, identification (ID), data collection, and a view housekeeping feature (i.e. view overall system functionality). A search may be implemented by directly reading the count rates from inputs from the controller 610, for example.

Generally, the identification of isotopes by the system 600 involves a process of looking for peaks in the gamma-ray spectrum. Since the energy calibration is known, the computer 608 knows which channels to read from the MCA. This selective read saves time, allowing a large number of peak regions to be acquired every second. Each peak region may be analyzed for statistical significance, above a linear background that is computed from three channels on each side of the region. Both the statistical significance the attribution to an isotope may be presented in a rapidly changing table of rank sorted isotopes.

When specified line pairs are present in statistically significant amounts, an entry may be made in the lower part of the screen, stating the ID. The top part may be, for example, a view of the real-time growth in confidence and the bottom may be the statistically significant observation (analysis). Some operators desire to see the data grow in and they may obtain this from the top window. Other operators simply want the answer, which may be presented in the lower window. Gamma ray lines may be specified with a user edited table that allows for single, double, or triple coincidence. The statistical requirement for an ID may depend on how many coincidences are entered. For example, the more coincidences required, the lower the individual line significance is required for a detection to be made. Additional constraints on ID include peak ratios or peak-to-Compton ration. This may save count time by trading any increasing spectral uniqueness for individual peak statistical significance, automatically.

Data collection by the system 600 may involve a process where the user has a chance to collect a spectrum, look at the data, and/or save it. The screen may provide the plot of the full spectrum. Optionally, the screen may be expanded for detailed examination. Linkage with the ID function may be automatic in that if the user wants to know the spectrum that led to the identified isotopes, the spectrum may still be in the MCA memory. The user may simply select a "get data" function and then save it. The view housekeeping function may provide a screen of numerical data that is consulted for status on the health of the entire instrument.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A radiation detection system, comprising:
   a radiation detector;
   a first enclosure encapsulating the radiation detector, the first enclosure including a low-emissivity infra-red (IR) reflective coating used to thermally isolate the radiation detector;
   a second enclosure encapsulating the first enclosure, the first enclosure being suspension mounted to the second enclosure;
   a first cooler capable of cooling the radiation detector;
   a first cooling interface positioned on the second enclosure for coupling the first cooler and the first enclosure; and
   a second cooling interface positioned on the second enclosure capable of coupling the first enclosure to an external cooler separate from the radiation detection system, wherein the external cooler is different from the first cooler.

2. The radiation detection system of claim 1, wherein the second enclosure includes a low-emissivity infra-red (IR) reflective coating used to further thermally isolate the radiation detector.

3. The radiation detection system of claim 1, wherein the first enclosure includes a case for the radiation detector.

4. The radiation detection system of claim 3, wherein the case mechanically secures the radiation detector.

5. The radiation detection system of claim 1, wherein the second enclosure includes a vacuum cryostat.

6. The radiation detection system of claim 1, wherein the radiation detector includes a germanium crystal.

7. The radiation detection system of claim 1, wherein the cooler includes a Stirling-cycle mechanical cooler.

8. The radiation detection system of claim 1, wherein the second cooling interface includes a flexible bellows.

9. The radiation detection system of claim 8, wherein the flexible bellows is built into at least one wall of the second enclosure.

10. The radiation detection system of claim 1, wherein the radiation detection system has a total weight of 3 to 6 pounds.

11. The radiation detection system of claim 1, wherein the suspension mounting includes an inner connector connectable to the first enclosure, an outer connector connectable to the second enclosure, and tie-downs for securing the inner connector and the outer connector in spaced relation to each other.

12. A method, comprising:
cooling a radiation detector included in a portable radiation detection system with a first cooler not included in the portable radiation detection system until the radiation detector reaches a predetermined temperature; and
cooling the radiation detector with a second cooler included in the portable radiation detection system to at least maintain the predetermined temperature;
wherein the first cooler utilizes a first cooling interface and the second cooler utilizes a second cooling interface separate from the first cooling interface.

13. The method of claim 12, wherein the portable radiation detection system includes a first enclosure encapsulating the radiation detector, the first enclosure including a low-emissivity infra-red (IR) reflective coating used to thermally isolate the radiation detector.

14. The method of claim 13, wherein the portable radiation detection system includes a second enclosure encapsulating the first enclosure, the first enclosure being suspension mounted to the second enclosure.

15. The method of claim 14, wherein the first cooling interface is positioned on the second enclosure for coupling the first cooler and the first enclosure.

16. The method of claim 15, wherein the second cooling interface is positioned on the second enclosure for coupling the second cooler and the first enclosure.

17. The method of claim 16, wherein the first enclosure includes a case for the radiation detector.

18. The method of claim 17, wherein the case mechanically secures the radiation detector.

19. The method of claim 18, wherein the second enclosure includes a vacuum cryostat.

20. The method of claim 16, wherein the radiation detector includes a germanium crystal.

21. The method of claim 16, wherein the second cooler includes a Stirling-cycle mechanical cooler.

22. The method of claim 16, wherein the first cooler includes a Joule-Thomson cooler.

23. The method of claim 16, wherein the first cooling interface includes a flexible bellows.

24. A radiation detection system, comprising:
a radiation detector;
a first enclosure encapsulating the radiation detector, the first enclosure including a low-emissivity infra-red (IR) reflective coating used to thermally isolate the radiation detector;
a second enclosure encapsulating the first enclosure, the first enclosure being suspension mounted to the second enclosure;
a first cooler capable of cooling the radiation detector;
a first cooling interface positioned on the second enclosure for coupling the first cooler and the first enclosure;
a second cooling interface positioned on the second enclosure capable of coupling the first enclosure to an external cooler separate from the radiation detection system, wherein the external cooler is different from the first cooler; and
wherein a ratio of an inner surface area of the second enclosure to an outer surface area of the first enclosure is less than about 1.5.

25. The radiation detection system of claim 24, wherein the ratio of the inner surface area of the second enclosure to the outer surface area of the first enclosure is about 1.4.

* * * * *